United States Patent
Nocereto et al.

(10) Patent No.: US 10,060,323 B1
(45) Date of Patent: Aug. 28, 2018

(54) METHOD AND SYSTEM FOR MONITORING REDUCTANT DELIVERY PERFORMANCE FOR AN SCR CATALYST

(71) Applicant: GM Global Technology Operations LLC, Detroit, MI (US)

(72) Inventors: Mariano Nocereto, Turin (IT); Luis Daniel Guerrero Cruz, Turin (IT); Raffaello Ardanese, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 15/444,603

(22) Filed: Feb. 28, 2017

(51) Int. Cl.
  *F01N 3/20* (2006.01)
  *F01N 11/00* (2006.01)
  *F01N 3/035* (2006.01)

(52) U.S. Cl.
  CPC .............. *F01N 11/00* (2013.01); *F01N 3/035* (2013.01); *F01N 3/208* (2013.01); *F01N 2550/02* (2013.01); *F01N 2550/05* (2013.01); *F01N 2570/14* (2013.01); *F01N 2610/02* (2013.01); *F01N 2610/144* (2013.01); *F01N 2610/146* (2013.01); *F01N 2610/1433* (2013.01); *F01N 2900/18* (2013.01); *F01N 2900/1808* (2013.01); *F01N 2900/1822* (2013.01)

(58) Field of Classification Search
  CPC ........ F01N 3/2066; F01N 3/208; F01N 11/00; F01N 2550/05; F01N 2610/02; F01N 2610/1433; F01N 2610/144; F01N 2610/146; F01N 2900/0416; F01N 2900/18; F01N 2900/1808; F01N 2900/1822
  See application file for complete search history.

(56) References Cited

U.S. PATENT DOCUMENTS

| | | | |
|---|---|---|---|
| 8,161,808 B2 | 4/2012 | Crawford et al. | |
| 8,869,607 B2 | 10/2014 | Levijoki et al. | |
| 2010/0005871 A1* | 1/2010 | Kitazawa | F01N 3/206 73/114.69 |
| 2010/0071349 A1* | 3/2010 | Kitazawa | F01N 3/2066 60/277 |
| 2011/0023456 A1 | 2/2011 | Levijoki et al. | |
| 2011/0061372 A1 | 3/2011 | Levijoki et al. | |
| 2012/0041596 A1 | 2/2012 | Thompson et al. | |
| 2012/0126989 A1 | 5/2012 | Vernassa et al. | |
| 2013/0014575 A1 | 1/2013 | Levijoki et al. | |
| 2013/0283771 A1* | 10/2013 | Nagata | F01N 3/2066 60/282 |

* cited by examiner

*Primary Examiner* — Audrey K Bradley
(74) *Attorney, Agent, or Firm* — Harness, Dickey & Pierce, P.L.C.

(57) ABSTRACT

A method of monitoring the reductant delivery performance of a selective catalytic reduction component of a vehicle exhaust system, includes operating a diesel exhaust fluid pump until a reductant delivery performance pressure setpoint is reached. Calculating an average pump duty cycle and commanding the calculated pump duty cycle to be used in the open loop control phase. Calculating an initial average pressure. Injecting a controlled diesel exhaust fluid (DEF). Calculating a final average pressure. Calculating a pressure drop ΔP and determining if the calculated pressure drop ΔP is less than an expected pressure drop calculated as a function of the average pump duty cycle.

1 Claim, 2 Drawing Sheets

Figure 1:
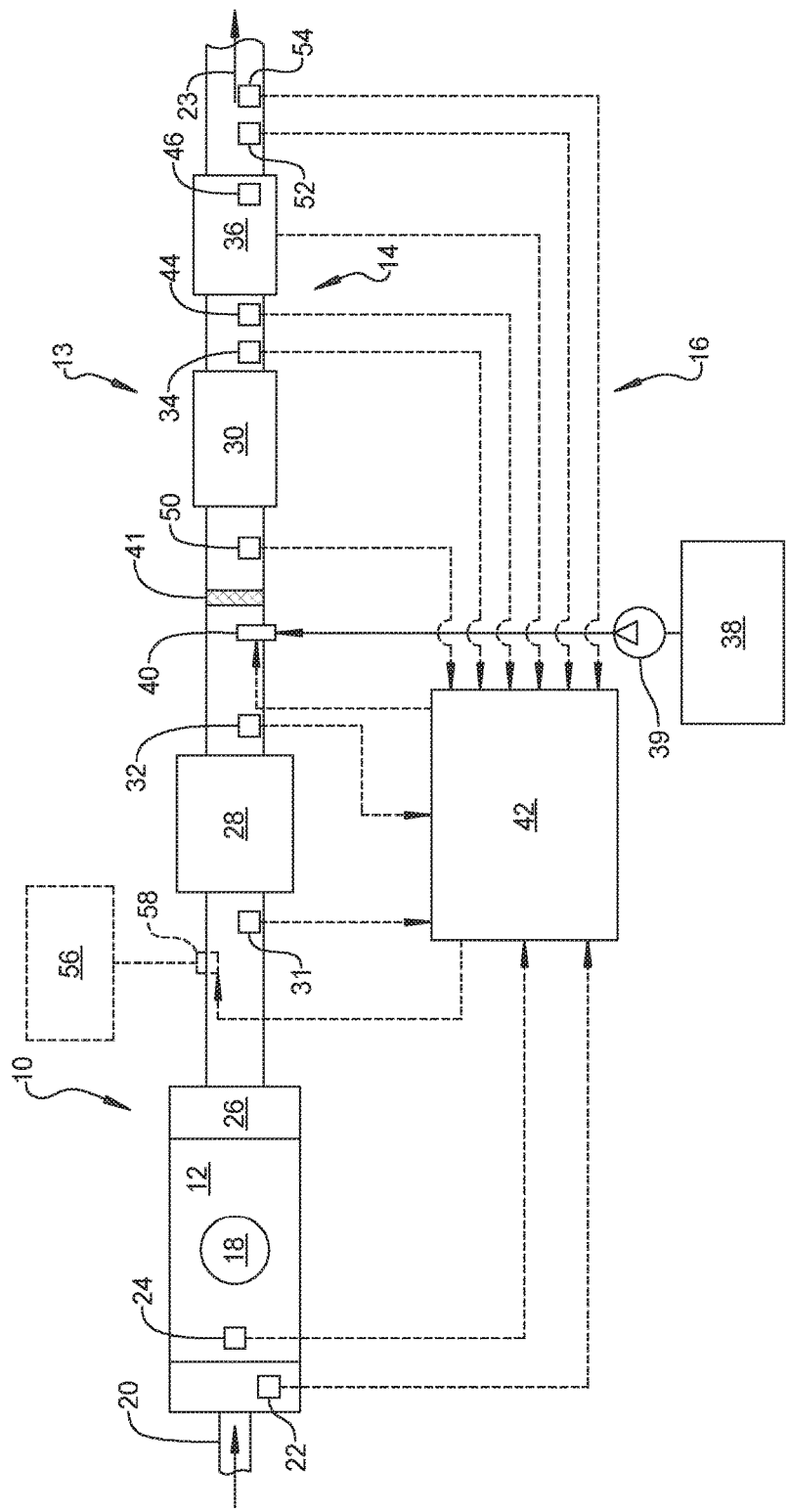

METHOD AND SYSTEM FOR MONITORING REDUCTANT DELIVERY PERFORMANCE FOR AN SCR CATALYST

FIELD

The present disclosure relates to a method and system for monitoring reductant delivery performance for an SCR catalyst.

BACKGROUND

This section provides background information related to the present disclosure which is not necessarily prior art.

During combustion in a diesel engine, an air/fuel mixture is delivered through an intake valve to cylinders and is compressed and combusted therein. After combustion, the piston forces the exhaust gas (i.e., the exhaust stream) to flow from the cylinders through an exhaust system, from which the exhaust stream is released to the atmosphere. The exhaust stream may contain oxides of nitrogen (NOx) and carbon monoxide (CO).

Exhaust stream treatment systems may employ catalysts in one or more components configured for accomplishing an SCR process such as reducing nitrogen oxides (NOx) to produce more tolerable exhaust constituents of nitrogen (N2) and water (H2O). Reductant may be added to the exhaust stream upstream from an SCR, and, for example only, the reductant may include anhydrous ammonia (NH3), aqueous ammonia or urea, any or all of which may be injected as a fine mist into the exhaust stream. When the ammonia, mixed with the other constituents of the exhaust stream, reaches the SCR component, the NOx emissions within the exhaust stream are broken down. A Diesel Particulate Filter (DPF) may then capture soot, and that soot may be periodically incinerated during regeneration cycles. Water vapor, nitrogen and reduced emissions exit the exhaust system.

To maintain efficient NOx reduction in the SCR component, a control may be employed so as to maintain a desired quantity of the reductant (i.e., reductant load) in the SCR component. As the exhaust stream, containing NOx, passes through the SCR component, the reductant is consumed, and the load is depleted. A model may be employed by the control to track and/or predict how much reductant is loaded in the SCR component and to maintain an appropriate reductant load for achieving a desired effect such as reduction of NOx in the exhaust stream.

California Air Resources Board (CARB) regulation requires for application equipped with selective catalytic reduction (SCR) to detect a system malfunctioned/deterioration (e.g. urea injection) that leads to improper urea delivery that would cause a vehicle's NOx emissions to exceed the regulated emission levels. Accordingly, it is desirable to provide a robust method and system for monitoring reductant delivery performance for an SCR catalyst.

SUMMARY

This section provides a general summary of the disclosure, and is not a comprehensive disclosure of its full scope or all of its features.

A method of monitoring the reductant delivery performance of a selective catalytic reduction component of a vehicle exhaust system, includes operating a diesel exhaust fluid pump until a reductant delivery performance pressure setpoint is reached. Calculating an average pump duty cycle and commanding the calculated pump duty cycle to be used in the open loop control phase. Calculating an initial average pressure. Injecting a controlled diesel exhaust fluid (DEF). Calculating a final average pressure. Calculating a pressure drop $\Delta P$ and determining if the calculated pressure drop $\Delta P$ is less than an expected pressure drop calculated as a function of the average pump duty cycle.

The system and method of the present disclosure provides a reductant delivery performance monitoring method and system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
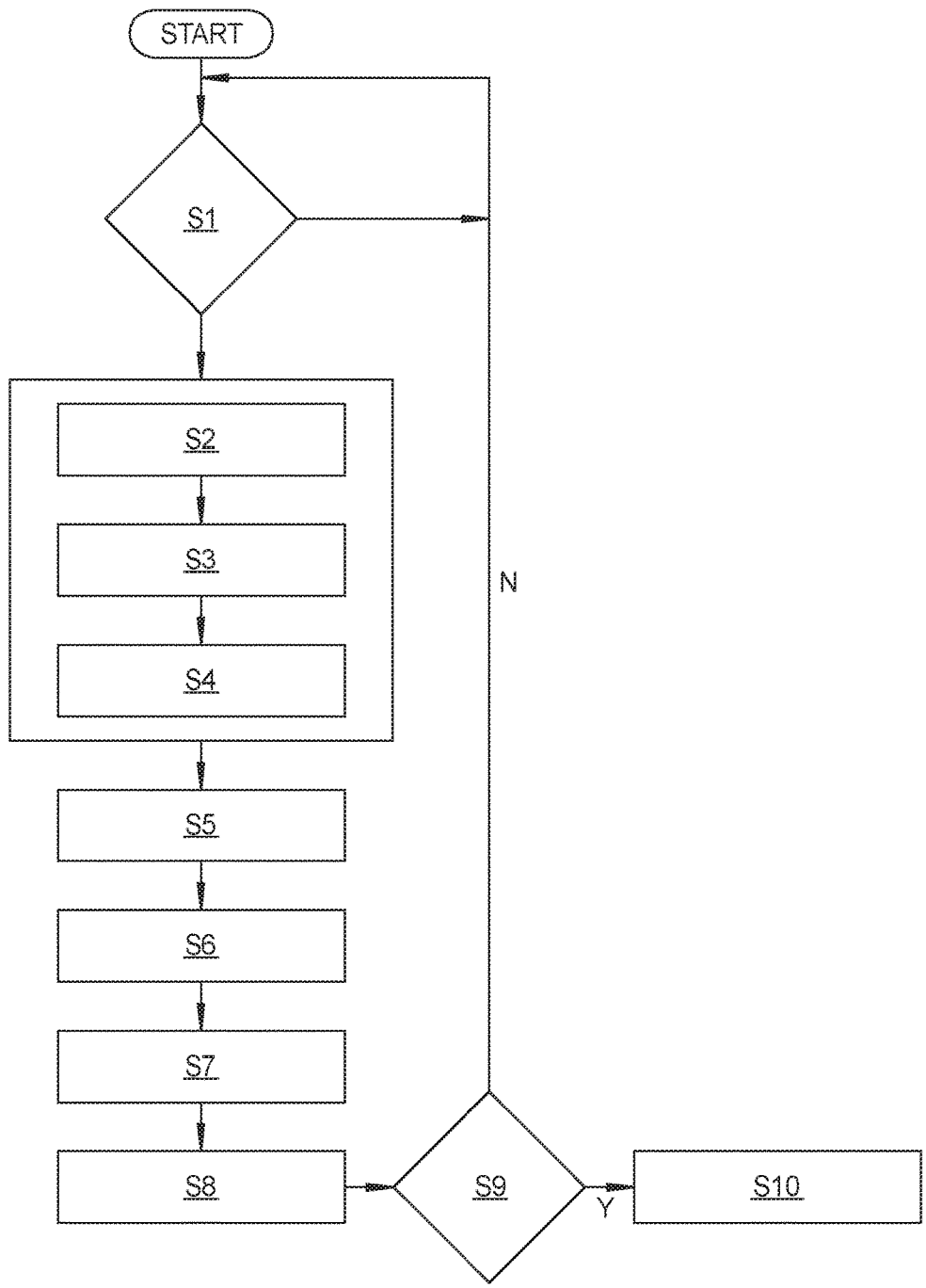

FIG. 1 is a functional block diagram of an engine control system including an exhaust diagnostic system according to the principles of the present disclosure; and FIG. 2 is a flow diagram illustrating the method of monitoring reductant delivery performance for an SCR catalyst according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

The exhaust stream 23 is produced inside the cylinder 18 as a result of the combustion process. The exhaust system 14 treats the exhaust stream 23 before the exhaust stream 23 is released to atmosphere. The exhaust system 14 includes an exhaust manifold 26 and a diesel oxidation catalyst (DOC) 28. The exhaust manifold 26 directs exhaust stream exiting the cylinder through the DOC 28. The exhaust stream is treated within the DOC 28 to reduce the regulated emissions. The exhaust system 14 further includes a selective catalytic reduction (SCR) component 30, an exhaust system upstream temperature sensor 31, an SCR component inlet temperature sensor 32, an SCR component outlet temperature sensor 34 and a particulate filter (PF) 36.

The exhaust system upstream temperature sensor 31 may be positioned between the engine and the DOC 28. The SCR component inlet temperature sensor 32 is located upstream from the SCR component 30 to monitor the temperature change at the inlet of the SCR component 30. The SCR component outlet temperature sensor 34 is located downstream from the SCR component 30 to monitor the temperature change at the outlet of the SCR component 30. Although the exhaust treatment system 13 is illustrated as including the SCR component inlet temperature sensor 32 and the SCR component outlet temperature sensor 34, both being arranged outside the SCR component 30, the inlet and outlet temperature sensors 32, 34 can be located inside the SCR component 30 while being configured and arranged so as to monitor the temperature (i.e., enthalpy) change of the exhaust stream at the inlet and outlet of the SCR component 30. The PF 36 further reduces emissions by trapping particulates (e.g., soot and other material) in the exhaust stream.

The dosing system 16 includes a dosing injector 40 that injects reductant from a reductant supply 38 and a pump 39 into the exhaust stream. The reductant mixes with the exhaust stream 23 and further reduces the emissions when the mixture is exposed to the SCR component 30. A mixer 41 may be used to mix the reductant with the exhaust stream 23 upstream from the SCR component 30. A control module 42 regulates and controls the operation of the engine system 10.

An exhaust stream flow rate sensor 44 may generate a signal corresponding to the flow rate of exhaust stream in the exhaust system 14. Although the sensor is illustrated between the SCR component 30 and the PF 36, various other locations within the exhaust system 14 may be used for measurement including downstream from the exhaust manifold 26 and upstream from the SCR component 30.

A particulate filter temperature sensor 46 generates a particulate filter temperature signal corresponding to a measured particulate filter temperature. The particulate filter temperature sensor 46 may be disposed on or within the PF 36. The particulate filter temperature sensor 46 may also be located upstream or downstream from the PF 36.

Other sensors in the exhaust system 14 may include an upstream NOx sensor 50 that generates a NOx signal based on a concentration of NOx present in the exhaust system 14. A downstream NOx sensor 52 may be positioned downstream from the PF 36 to measure a concentration of NOx leaving the PF 36. In addition, an ammonia (NH3) sensor 54 generates a signal corresponding to the amount of ammonia within the exhaust stream. The NH3 sensor 54 is optional, but can be used to simplify the control system due to the ability to discern between NOx and NH3. Alternately and/or in addition, a hydrocarbon (HC) supply 56 and a HC injector 58 may be provided to supply HC in the exhaust stream 23 reaching the DOC 28.

The method of the present disclosure is intended to remove the diesel exhaust fluid (DEF) motor pump 39 performance dependency. With reference to FIG. 2, the method includes determining if enablement criteria are met, at step S1. Enabling conditions are the environmental and system conditions for which it is possible to perform the reductant delivery performance without compromising the system performance or components safety. The enablement criteria can include, but are not limited to determining: whether ambient temperature and pressure conditions are within the range for which the SCR is able to reduce the Nox; whether the Diesel Exhaust Fluid (DEF) pressure system is enabled and working in closed loop control; whether the Diesel Exhaust Fluid injector is not exposed to exhaust temperatures close to the component limit; that the Diesel Particulate Filter is not performing a regeneration cycle; whether the SCR Catalyst temperatures are in the range for which it's safe to perform high DEF injection flow rates; the SCR Catalyst temperature variation; whether the engine is running with an exhaust gas flow through the exhaust line high enough to allow high DEF injection flow rates; and whether any faults on the DEF system are detected.

Steps S2-S4 constitute a preparation phase. The reductant delivery performance requires a dedicated pressure set point at step S2, the pump 39 is run until the reductant delivery performance pressure setpoint is reached. Once the dedicated pressure set point is reached, an average pump duty cycle calculation is performed, at step S3. At step S4, the calculated pump open loop duty cycle is commanded to be used in the open loop control phase. With the preparation phase, the test starts with the same pressure condition independently of the pump performance. At step S5 an initial average pressure calculation is performed. At step S6, a controlled diesel exhaust fluid (DEF) injection is performed. At step S7, a final average pressure calculation is performed and a pressure drop $\Delta P$ is calculated at step S8. At step S9, it is determined if the calculated pressure drop $\Delta P$ is less than an expected pressure drop calculated as a function of the average pump duty cycle calculated during the preparation phase thereby removing the dependency from the motor pump performance dispersion when the measured pressure drop is evaluated. At step S10, the diagnostic trouble code (DTC) is set.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of monitoring the reductant delivery performance of a selective catalytic reduction component of a vehicle exhaust system, comprising:
   operating a diesel exhaust fluid pump until a reductant delivery performance pressure setpoint is reached;
   calculating an average pump duty cycle and commanding the calculated pump duty cycle to be used in an open loop control phase;
   calculating an initial average pressure;
   injecting a controlled diesel exhaust fluid (DEF);
   calculating a final average pressure;
   calculating a pressure drop $\Delta P$; and
   determining if the calculated pressure drop $\Delta P$ is less than an expected pressure drop calculated as a function of the average pump duty cycle.

* * * * *